United States Patent [19]

Albright

[11] 4,083,826
[45] Apr. 11, 1978

[54] POLYMERIC COMPOSITIONS CONTAINING A FLAME RETARDANT AMOUNT OF A BIS(2,3-DIBROMOPROPYL)-CHLOROALKYL PHOSPHATE

[75] Inventor: James A. Albright, Ann Arbor, Mich.

[73] Assignee: Velsicol Chemical Corporation, Chicago, Ill.

[21] Appl. No.: 683,356

[22] Filed: May 5, 1976

[51] Int. Cl.² .................. C08K 5/53; C07F 9/09
[52] U.S. Cl. ..................... 260/45.7 P; 260/96.3
[58] Field of Search ..................... 260/963, 45.7 P

[56] References Cited

U.S. PATENT DOCUMENTS

| | | | |
|---|---|---|---|
| 3,079,418 | 2/1963 | Pumpelly | 260/963 |
| 3,318,978 | 5/1967 | Palethorpe | 260/963 |
| 3,513,644 | 5/1970 | Weil | 260/963 UX |
| 3,846,373 | 11/1974 | Takeya et al. | 260/45.7 P |

FOREIGN PATENT DOCUMENTS 1,301,734  7/1962  France .................. 260/962

*Primary Examiner*—Anton H. Sutto
*Attorney, Agent, or Firm*—Robert M. Phipps; Howard J. Greenwald

[57] ABSTRACT

A compound of the formula

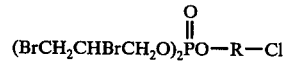

wherein R is a straight or branched chain alkyl group containing from about 2 to about 12 carbon atoms and polymeric compositions comprising a polyurethane, polyester, cellulosic-polyester blend or styrenated polyester polymer and a flame retarding amount of the described compound.

9 Claims, No Drawings

POLYMERIC COMPOSITIONS CONTAINING A FLAME RETARDANT AMOUNT OF A BIS(2,3-DIBROMOPROPYL)-CHLOROALKYL PHOSPHATE

BACKGROUND OF THE INVENTION

1. Field of the Invention

This invention pertains to the field of straight chain haloalkyl phosphate compounds and to polymeric compositions containing said phosphate compounds as a flame retardant preservative.

2. Description of the Prior Art

Both tris(2,3-dibromopropyl)phosphate and tris(2-chloroethyl)-phosphate are well known, commercially used flame retardants. Tris-(2-chloroethyl)phosphate combines the good qualities of low cost and low viscosity. The low viscosity of tris(2-chloroethyl)phosphate allows for the easy handling and pumping of said flame retardant for incorporation into a polymerization reaction. The low viscosity of tris(2-chloroethyl)phosphate also results in a more thorough mixing and, thus, more uniform distribution of said flame retardant in the polyurethane. The use of tris(2-chloroethyl)phosphate is limited by the fact that it is volatile because of its low molecular weight and thus migrates from the polymer causing a loss of permanent flame retardancy. Furthermore, tris(2-chloroethyl)-phosphate lacks thermal and hydrolytic stability causing the degradation of foams having said flame retardant incorporated therein and equipment exposed thereto.

Tris(2,3-dibromopropyl)phosphate, on the other hand, is both more thermally and more hydrolytically stable than tris(2-chloroethyl)phosphate and has sufficient molecular weight to prevent major losses through volatility. However, tris(2,3-dibromopropyl)-phosphate is a highly viscous liquid which is difficult to handle and process.

A novel class of compounds has been discovered which combines the greater hydrolytic and thermal stability as well as the lower volatility of tris(2,3-dibromopropyl)phosphate with the lower viscosity of tris(2-chloroethyl)phosphate while eliminating the undesirable properties of the above prior art compounds, i.e., the bis(2,3-dibromopropyl)-chloroalkyl phosphates within the scope of this invention possess a greater hydrolytic and thermal stability as well as a lower volatility than tris(2-chloroethyl)phosphate while also possessing a significantly lower viscosity than tris-(2,3-dibromopropyl)phosphate.

SUMMARY OF THE INVENTION

A compound of the formula $$(BrCH_2CHBrCH_2O)_2 \overset{O}{\underset{\|}{P}} O-R-Cl \quad (I)$$

wherein R is a straight or branched chain alkyl group containing from about 2 to about 12 carbon atoms. Also, a polymeric composition comprising a polymer selected from the group consisting of polyurethane including flexible and rigid foams and elastomers, polyester, both saturated and unsaturated polyester, styrenated polyester, and cellulosic polyester blends, and a flame retarding amount of the compound formula I above.

DESCRIPTION OF THE PREFERRED EMBODIMENTS

The compounds within the scope of this invention have the formula I above wherein R is a straight or branched chain alkyl group containing from about 2 to about 12 carbon atoms, preferably from about 2 to about 6 carbon atoms, and more preferably from about 2 to about 4 carbon atoms. The chlorine substituent on the straight or branched chain alkyl group need not be located solely at the terminal carbon atom but may be attached to any carbon atom not adjacent the oxygen atom. For the purposes of illustration only, Table I is designed to further help describe the compounds of formula I of this invention and is neither meant not should it be taken to be a complete listing of all the compounds within the scope of formula I of this invention. The following is a partial listing of those preferred compounds within the scope of formula I: bis(2,3-dibromopropyl)-2-chloropropyl phosphate, bis(2,3-dibromopropyl)-3-chloropropyl phosphate, bis(2,3-dibromopropyl)-6-chlorohexyl phosphate and bis(2,3-dibromopropyl)-2-chloroethyl phosphate.

TABLE I

Wherein —R—Cl is:

1 —$CH_2CH_2Cl$
2 —$(CH_2)_2CH_2Cl$
3 —$CH_2CHClCH_3$
4 —$(CH_2)_3CH_2Cl$
5 —$CH_2CHClCH_2CH_3$
6 —$(CH_2)_2CHClCH_3$
7 —$(CH_2)_4CH_2Cl$
8 —$CH_2CHCl(CH_2)_2CH_3$
9 —$(CH_2)_2CHClCH_2CH_3$
10 —$(CH_2)_3CHClCH_3$
11 —$(CH_2)_5CH_2Cl$
12 —$(CH_2)_3CHCl(CH_2)_2CH_3$
13 —$(CH_2)_4CHCl(CH_2)_2CH_3$
14 —$(CH_2)_3CHCl(CH_2)_4CH_3$
15 —$(CH_2)_8CH_2Cl$
16 —$CH_2CHCl(CH_2)_7CH_3$
17 —$(CH_2)_{10}CH_2Cl$
18 —$(CH_2)_{11}CH_2Cl$
19 —$CHCHCl(CH_2)_9CH_3$
20 —$(CH_2)_5CHCl(CH_2)_5CH_3$
21 —$CH(CH_3)CH_2Cl$
22 —$CH(CH_2CH_3)CH_2Cl$

The compounds of the present invention can be prepared according to the following general reaction scheme:

$$2(BrCH_2CHBrCH_2OH) + POCl_3 \longrightarrow$$

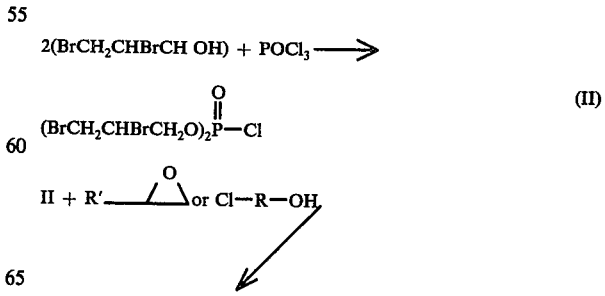

-continued

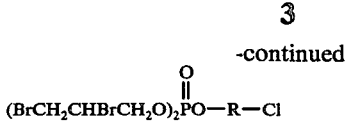
(I)

wherein R' is hydrogen or an alkyl group containing from about 1 to about 10 carbon atoms and wherein R is as defined above. As shown in the above reaction scheme, two moles of 2,3-dibromopropanol are reacted with one mole of phosphorus oxychloride. This reaction can be performed in the presence or absence of the solvent. If a solvent is used, an inert solvent can be employed, e.g., toluene, benzene, ether, etc. The above reaction can be performed at from about 0° to about 120° C. for about 1 to about 12 hours, preferably from about 3 to about 4 hours. Catalytic quantities of a metal salt or oxide such as magnesium oxide, magnesium chloride, calcium oxide, calcium chloride, titanium chloride, or vanadium acetate, or stochiometric quantities of a weak organic base such as pyridine or triethylamine, can be used to accelerate the completion of the reaction. Titanium salts and oxides are preferred catalysts. The intermediate bis(2,3-dibromorpopyl)chlorophosphate is further reacted without any purification. Said intermediates can be reacted with either epoxides or chloroalkanols to form the desired end product having formula I. The latter reaction can be conducted at various temperatures depending upon whether an epoxide or chloroalkanol reactant is used. If an epoxide reactant is used, the temperature at which the reaction can be conducted is from about 40° to about 100° C. If a chloroalkanol reactant is used, the temperature at which the latter reaction can be conducted is from 0° to about 100° C. With either reactant, the latter reaction can be conducted with or without a solvent. If a solvent is employed, inert solvents can be used, e.g., toluene benzene, ether, etc. The reaction can be conducted over a period of from about 1 to about 12 hours, preferably from about 3 to about 4 hours. Catalytic quantities of a metal salt or oxide such as magnesium oxide, magnesium chloride, calcium oxide, calcium chloride, titanium chloride, or vanadium acetate, or stochoimetric quantities of a weak organic base such a pyridine or triethylamine, can be used to accelerate the completion of the latter reaction. As above, the titanium salts and oxides are the preferred catalysts. The final product can be washed with a basic solution, e.g., an ammonia, sodium hydroxide, or sodium bicarbonate solution, to remove any residual acidity. This basic solution wash can be followed by a water wash. The final product is then dried under vacuum at a convenient temperature, e.g., from about 80° to about 120° C., until constant weight is achieved. As noted above, R' can be either hydrogen or an alkyl group containing from about 1 to about 10 carbon atoms. If R' is hydrogen, the end product will be bis(2,3-dibromopropyl)-2-chloroethyl phosphate. If R' is an alkyl radical containing from about 1 to about 10 carbon atoms, the end product will be a bis(2,3-dibromopropyl)-2-chloroethyl-1-alkyl phosphate. If the chloroalkanol reactant is used, the desired end product can have a chlorine substituent located at any place on the carbon chain greater than or equal to 2 carbon atoms distant from the oxygen atom.

The compounds of formula I are useful flame retardants in polymeric compositions selected from the group consisting of polyurethane, including flexible and rigid foams and elastomers, polyester, both saturated and unsaturated polyester, styrenated polyester and cellulosic polyester blends, e.g., 35/65, 50/50, and 65/35 cotton/polyester blends. A detailed description of the polyurethane and polyester polymeric compositions capable of being used with the flame retardants of formula I can be found in Modern Plastics Encyclopedia, Vol. 52, No. 10 A, McGraw-Hill, Inc., New York, NY (1975), said Encyclopedia being incorporated herein in toto by reference.

It is also contemplated that the flame retardants of formula I will possess excellent flame retardant efficacy in polystyrene, including both crystalline and high-impact types, and styrene copolymers such as styrene-butadiene and acrylonitrile-butadiene-styrene terpolymers. A detailed description of polystyrene and styrene co- and terpolymers can be found in Modern Plastics Encyclopedia, ibid., said Encyclopedia having been incorporated herein in toto by reference.

The amount of flame retardant which is used in the compositions and in the methods of this invention is that amount necessary to produce measurable flame retardancy in the compositions which are so modified. Depending upon the particular compound and the particular polymer with which it is combined, the quantity of flame retardant employed in the compositions and methods of this invention can be of any amount up to about 35 percent or more by weight of the total composition. For most compositions, the flame retardant will comprise from about one to about 25 percent by weight of the total composition.

In addition to the flame retardant compounds within the scope of this invention, the flame retardancy of a polymer such as polystyrene can be further enhanced through the use of so called "synergists" or enhancing agents which, when used with the compounds of formula I, promote a cooperative effect therebetween and thus enhance the flame retardancy of the resultant plastic composition as compared to the flame retardancy of either one component used separately. These "enhancing agents" comprise the oxides and halides of groups IVA and VA of the Periodic Table, and are further described in Modern Plastics Encyclopedia, ibid., as well as U.S. Pat. Nos. 2,993,924; 2,996,528; 3,205,196 and 3,878,165. Without limitation, preferred enhancing agents include $Sb_2O_3$, $SbCl_3$, $SbBr_3$, $SbI_3$, $SbOCl$, $As_2O_3$, $As_2O_5$, $ZnBO_4$, $BaB_2O_4 \cdot H_2O$, $2 \cdot ZnO \cdot 3B_2O_3 \cdot 3.5H_2O$ and stannous oxide hydrate. The more preferred enhancing agent is antimony trioxide.

It is also within the scope of the present invention to employ other materials in the present invention compositions where one so desired to achieve a particular end result. Such materials include, without limitation, adhesion promotors; antioxidants; antistatic agents; antimicrobials; colorants; heat stabilizers; light stabilizers; pigments; plasticizers; preservatives; ultraviolet stabilizers and fillers. The above mentioned materials, including filler, are more fully described in Modern Plastics Encyclopedia, ibid., and which publication has been incorporated herein in toto by reference.

The amount of the above described materials employed in the present invention compositions can be any quantity which will not substantially adversely affect the desired results derived from the present invention compositions. Thus, the amount used can be 0 percent, based on the total weight of the composition, up to that percent at which the composition can still be classified as a plastic. In general, such amount will be from about 0% to about 75% and more specifically from about 1% to about 50%.

The flame retardants can be incorporated into the polymer during the polymerization of the monomeric reactants as long as care is taken to minimize any adverse side reactions between the flame retardant and any of the other constituents of the reaction mixture. Alternatively, the flame retardant can be mixed with dissolved, powdered or pelleted polymer prior to molding, thereby providing after molding a finished polymeric article with the flame retardant intimately mixed throughout. Suitable mixing methods include mill rolling and dry mixing in machinery such as a Banbury mixer or the like. Adding flame retardant to a solution or dispersion of the polymer is also acceptable. A third method for combining polymer and flame retardant additive comprises a topical application of the additive to the polymer in its finished form. As an example, a textile filament, fiber, yarn or the like can be passed through a solution, suspension or dry powder of the additive, which is deposited on the polymer as it passes through the medium containing the flame retardant. Instead of a textile fiber, the polymer can be in any finished shape as long as it can somehow be immersed or sprayed or otherwise surface-coated with the flame retardant medium. To aid the polymer in picking up a sufficient quantity of the flame retardant, the surface of the polymer can be pre-treated with a substance which will render the polymer more receptive to the flame retardant. After the topical application, the polymeric article can be subjected to a post-treatment which results in the flame retardant additive being firmly adhered to the surface of the polymer. Suitable post-treatments can include the application of heat, pressure or both to the polymeric article, or a subsequent coating of the flame retardant-treated article with a binder to adhere the flame retardant firmly to the polymer. For other techniques as well as a further description of incorporating the flame retardant compounds of formula I into or onto elastomeric or polymeric materials, see J. M. Lyons, "The Chemistry and Uses of Fire Retardants", Wiley-Interscience, New York, 1970, and Z. E. Jolles, "Bromine and Its Compounds", Academic Press, New York, 1966, said references being incorporated herein in toto by reference.

The following examples are provided for the purpose of further illustration only and are not intended to be limitations on the disclosed invention. Unless otherwise specified, all temperatures are expressed in degrees centigrade; all weights are expressed in grams; and all volumes are expressed in milliliters.

EXAMPLE 1

Preparation of bis(2,3-dibromopropyl)-2-chloroethyl phosphate

Into a three necked five liter flask equipped with mechanical stirrer, thermometer, condenser and dropping funnel was charged 924 g of phosphoryl chloride and 10 g titanium tetrachloride. The solution was heated to 65° C. and 2616 g of 2,3-dibromopropanol was added dropwise over a four hour period. Upon complete addition, the solution was heated to 80° C. for four hours. After cooling to 60° C., gaseous ethylene oxide (290 g) was added over a three hour period. A slightly exothermic reaction was observed. The resulting product was washed with an equal volume of water at 50° C., followed by an aqueous ammonia wash and two additional water washes. The volatiles were removed by steam stripping. The product was treated with celite and celkate, dried and filtered. The resulting 2709 g of product was analyzed and the following results obtained: Viscosity = 1300/28° C., Acid # = 0.1 mg KOH/g sample, % Br = 55.61 (theory = 57.2), % Cl = 6.66 (theory = 5.4) % water = 0.05.

In a similar manner, other compounds within the scope of formula I, e.g., bis(2,3-dibromopropyl)-2-chloropropyl phosphate, bis(2,3-dibromopropyl)-3-chloropropyl phosphate, bis(2,3-dibromopropyl)-6-chlorohexyl phosphate, bis(2,3-dibromopropyl)-1-chloro-2-propyl phosphate and bis(2,3-dibromorpopyl)-12-chlorododecane phosphate can be prepared when the corresponding oxide is employed.

EXAMPLE 2

An 80/20 mixture of toluene 2,4- and 2,6-diisocyanate, Type I, toluene diisocyanate (hereinafter referred to as TDI) was placed in a first tank of a Martin Sweets Modern Module No. 3A urethane foam equipment modified for six components. Bis(2,3-dibromopropyl)-2-chloroethyl phosphate (kg) was mixed with 10 kg of Pluracol GP 3030 polyol in a second tank. (Pluracol GP 3030, BASF Wyandotte, Wyandotte, MI., is a polypropylene glycol having a molecular weight of approximately 3000 and a hydroxyl number of approximately 56.) Stannous octoate catalyst was placed in a third tank (T-9, M & T Chemicals, Inc., New York, NY). Into a fourth tank was placed a silicone surfactant (L-540, Union Carbide Corp., New York, NY). A water/Dabco 33LV mixture (3/0.29–0.46) was added to a fifth tank. (Dabco 33LV, Houndry Process & Chemical Co. in a 33% solution of triethylene diamine in dipropylene glycol.) All the above components were simultaneously mixed using a size 3 pin type mixer at 3,000 rmp in the following ratio:

| Component | Parts by per hundred parts Polyol (php) |
|---|---|
| Flame Retardant | 10 |
| Polyol | 100 |
| TDI | 39.0 |
| Stannous Octoate | 0.21 – 0.3 |
| Silicone Surfactant | 1.0 |
| Water | 3.0 |
| Triethylene Diamine/Dipropylene Glycol Solution, 33% | 0.29 – 0.46 |

The mixture was dropped during the mixing procedure into a 14 inch × 14 inch × 6 inch Adstrom cardboard box. After the flexible foam came to full height it was post cured in a forced air oven at 210° to 220° F. for 30 minutes.

After allowing the foam to sit for at least 7 days, the foam was then subjected to several tests and the data obtained therefrom are reported in Table II.

The same procedure was used to make other flexible foams having different flame retardant load levels. These foams were also subjected to the same tests and the data obtained therefrom are also reported in Table II.

TABLE II

| | Combustibility of Flexible Urethane Foam | | | | |
|---|---|---|---|---|---|
| | Flame Retardant Load Level (php) | | | | |
| | 0 | 2.5 | 5 | 10 | 20 |
| Oxygen Index,%[a] | 19 | 23 | 23.5 | 24 | 27.5 |
| MVSS302[b] | | | | | |
| Initial | 3.9[c](10)[d] | 0(0) | 0(0) | 0(0) | 0(0) |
| Aged[e] | 3.46 (4.8) | 0(0) | 0(0) | 0(0) | 0(0) |

TABLE II-continued

| Combustibility of Flexible Urethane Foam | | | | | |
|---|---|---|---|---|---|
| | Flame Retardant Load Level (php) | | | | |
| | 0 | 2.5 | 5 | 10 | 20 |
| Aged[f] | 3.66 (10) | — | — | 0 | 0 |

[a]ASTM D-3863-74.
[b]Motor Vehicle Safety Standard 302, Department of Transportation.
[c]Numbers without parentheses are inches per minute burn rate based on burn past the timing line.
[d]Numbers in parentheses are inches of burn distance from the timing line.
[e]Aged as per ESBM25P3-A, Ford Motor Corporation.
[f]Aged as per FBML TM 32-10, General Motors Corporation.

EXAMPLE 3

A rigid foam was prepared using the following basic formulation:

| Component | Parts per Hundred Parts Polyol |
|---|---|
| Polyol[a] | 100 |
| Silicone Glycol Surfactant[b] | 2 |
| Trichlorofluoromethane[c] | 35 |
| Polyisocyanate[d] | 135 |

[a]alkanolamine polyol, molecular weight approximately 3500, hydroxyl number approximately 530, Thanol R-350-X, Jefferson Chemical Co., Houston, TX.
[b]Dow Corning 193, Dow Corning Corp., Midland, MI.
[c]Freon 11B, E. I. Du Pont De Nemours and Co., Wilmington, DE.
[d]Polymeric aromatic isocyanate, 31.5% available NCO, Mondur MRS, Mobay Chemical Co., Pittsburgh, PA.

The polyol, surfactant, and fluorocarbon blowing agent were combined in a masterbatch based on 1000 gm of polyol to minimize loss of flowing agent.

The following procedure was used to prepare the foam:
1. The polyisocyanate was weighed into a tared, 10 ounce, paper cup (allowances being made for holdup) and the cup set aside while the remaining ingredients were weighed out and mixed.
2. The polyol masterbatch was weighed out, in the proper amount to give 100 grams of polyol, in a one quart, untreated, paper cup.
3. The 30 grams of the flame retardant of Example 1 were then weighed into the same one quart cup.
4. The contents of the one quart cup were mixed at 1000 rpm for 5 seconds.
5. The polyisocyanate was then added and stirring at 1000 rpm continued for 10 seconds.
6. The mix was poured into a 5-pound, untreated, paper tub and allowed to rise.

After the foam was tack-free, and substantially cured, it was set aside for at least 7 days prior to subjecting said foam to an Oxygen Index Test, ASTM D-2863-74. The results of said test are reported in Table III.

The same procedure was used to make other foams at different load levels and sometimes also containing a different flame retardant additive. These foams were also subjected to the same Oxygen Index Test (O.I.) as the above foam and the data are also reported in Table III.

TABLE III

| Flame Retardant | Load Level, php | O.I.,% |
|---|---|---|
| Control | 0 | 21.0 |
| Example 1 | 30 | 26.5 |
| Tris(2,3-dibromo-propyl)phosphate | 30 | 26.0 |

EXAMPLE 4

Into an unsaturated polyester general purpose (unhalogenated) resin (hereinafter referred to as a "GP resin") at 30% styrene was mixed another 5% styrene (Koppers 2000-25 brand GP resin at 30% styrene, Koppers Company, Pittsburgh, Pennsylvania). Into the above mixture was added 0.5 parts per hundred resin (phr) of a 6% solution of cobalt naphthalate promoter. This was followed by the addition of 15.0 phr of the flame retardant of Example 1. Next was added 1.0 phr methyl ethyl ketone peroxide catalyst. The above resin-flame retardant mixture was used to make the laminate as follows: Using three separate one-ply, 1.5 ounce per square foot, class E glass mats, (1) Put down one ply of said glass mats on a polyester film. (2) Coat above glass mat with above resin-flame retardant mixture. (3) Using a roller, roll said mixture into the glass mat. (4) Repeat above steps 1 to 3 building a three-ply GP resin flame retardant laminate. (5) Put another sheet of polyester film on top. (6) Roll top of film to remove all air pockets. (7) Cure at room temperature (about 25° C.) for about 16 hours. (8) Postcure for 1 hour at 100° C. (9) The above flame retardant laminate is ready for testing. This three-ply laminate was subject to various tests and the data obtained therefrom are reported in Table IV.

Additional GP resin laminate samples were prepared which contained either a different or no flame retardant additive. These samples were tested in the same manner and the results obtained are also reported in Table IV.

TABLE IV

| Flame Retardant Additive | Load Level, phr | O.I.,% |
|---|---|---|
| Control | 0 | 20.5 |
| Tris(2-chloroethyl)-phosphate | 15 | 26.3 |
| Tris(2,3-dibromopropyl)-phosphate | 15 | 26.5 |
| Bis(2,3-dibromopropyl)-2-chloroethyl phosphate | 15 | 26.8 |

EXAMPLE 5

Samples of a 100% woven, heatset, polyester fabric (Style 755H Testfabric, Inc., Middlesex, N.J.) were treated with the following emulsion concentrate by a pad, dry, cure, and afterwash procedure.

Emulsion Concentrate 50 gms bis(2,3-dibromopropyl)-2-chloroethyl phosphate
10 gms Emulsifying Agent[1]
40 gms Solvent[2].

[1]The emulsifying agent was an anionic blend of oil-soluble metal sulfonates with polyoxyethylene ethers having an HLB value of 12.5. (Emcol N-141 brand emulsifying agent, Witco Chemical Co., Inc., Chicago, Ill.)
[2]The solvent had a flash point of about 110° F. and a boiling point of about 315° F. (Hi-Sol 10 brand solvent, Ashland Chemical Company, Columbus, Ohio)

The wet pick-up of the finish was 67%. The fabrics were dried on pin-frames for five minutes at 105° to 110° C. and then frame cured for 90 seconds at 204° C., scoured in a Kenmore Model 600 washing machine at 70° to 75° C. in a solution containing 0.1% soda ash and 0.05% phosphate surfactant in free acid form detergent (Triton QS-44 brand detergent, Rohm and Haas Co., Philadelphia, Pa.), and tumble dried.

Fabric flammability was determined by measuring the oxygen index and bromine counts at critical steps during fabric processing. The data is given in Table V.

TABLE V

| Bromine X-Ray Counts | | | Oxygen Index,% |
|---|---|---|---|
| Dry | Cure | Afterwash | |
| 13,183 | 13,208 | 11,685 | 28 |

As with compound 1 of Table I, other compounds with the scope of formula I, for example, bis(2,3-dibromopropyl-2-chloropropyl phosphate, bis(2,3-dibromopropyl)-3-chloropropyl phosphate, and bis(2,3-dibromopropyl)-6-chlorohexyl phosphate, will display similar flame retardant efficacy in polyurethane, including flexible and rigid foams and elastomers, polyester, both saturated and unsaturated polyester, styrenated polyester and cellulosic polyester blends.

EXAMPLE 6

The hydrolytic stability of bis(2,3-dibromopropyl)-2-chloroethyl phosphate, tris(2,3-dibromopropyl)phosphate, and tris(2-chloroethyl)phosphate was determined by the following procedure: A magnetically stirred emulsion containing 4 grams of one of the above three compounds, 1 gram of Emcol AM2-10C brand emulsifier is a mixture of free acid of phosphated nonionic plus nonionic, Witco Chemical Corporation, New York, NY), and 45 grams of water was heated at 100° C. for 44 hours. The acid number of the emulsion was then determined by titration with a standard potassium hydroxide solution and the results are tabulated in Table VI. A compound's acid number is inversely proportional to the hydrolytic stability of that compound, i.e., the larger a compound's acid number, the poorer will be said compound's hydrolytic stability

TABLE VI

Hydrolytic Stability Tests

| Compound | Acid # (mgKOH/g Sample) |
|---|---|
| tris(2-chloroethyl)phosphate | 7.81 |
| bis(2,3-dibromopropyl)-2-chloroethyl phosphate | 3.09 |
| tris(2,3-dibromopropyl)phosphate | 2.55 |

EXAMPLE 7

The thermal stability of the same compounds tested in Example 6 was determined by the procedure set forth in Section 9-951, "Thermogravimetric Analyzer", of "Instruction Manual 990, Thermal Analyzer and Modules", E. I. Du Pont De Nemours and Co. (Inc.), Instrument Products Division, Wilmington, Del. 19898. The results of the thermogravimetric analyses (TGA) of the three compounds at several different weight losses are tabulated in Table VII.

TABLE VII

TGA Results

| | Tris(2-chloroethyl)phosphate | Bis(2,3-dibromopropyl)-2-chloroethel phosphate | Tris(2,3-dibromopropyl)phosphate |
|---|---|---|---|
| 5% Weight Loss | 170° C. | 205° C. | 260° C. |
| 10% Weight Loss | 182° C. | 243° C. | 273° C. |
| 25% Weight Loss | 197° C. | 268° C. | 288° C. |
| 50% Weight Loss | 209° C. | 286° C. | 307° C. |
| 75% Weight Loss | 218° C. | 296° C. | 318° C. |

EXAMPLE 8

The viscosity of bis(2,3-dibromopropyl)-2-chloroethyl phosphate was determined using a rotating spindle Brookfield viscometer. The viscosities of tris(2,3-dibromopropyl)phosphate, and tris(2-chloroethyl)phosphate, were obtained from their manufacturers' product information bulletins. All of the above viscosities are tabulated in Table VIII.

TABLE VIII

| Compound | Viscosity, cps | Temp., ° C. |
|---|---|---|
| Tris(2-chloroethyl)phosphate | 40 | 22.8 |
| Bis(2,3-dibromopropyl)-2-chloroethyl phosphate | 1792 | 22.8 |
| Tris(2,3-dibromopropyl)phosphate | 9200 | 25 |

As Tables VI, VII, and VIII clearly indicate the compounds within the scope of this invention, for example, bis(2,3-dibromopropyl)-2-chloroethyl phosphate, bis(2,3-dibromopropyl)-2-chloropropyl phosphate, bis(2,3-dibromorpopyl)-3-chloropropyl phosphate, and bis(2,3-dibromopropyl)-6-chlorohexyl phosphate, combine the greater hydrolytic and thermal stability as well as the lower volatility of tris(2,3-dibromopropyl)phosphate with the lower viscosity of tris(2-chloroethyl)phosphate while eliminating the undesirable properties of the above prior art compounds, i.e., the compounds of formula I, as exemplified by compound 1 of Table I, possess a greater hydrolytic and thermal stability as well a lower volatility than tris(2-chloroethyl)phosphate while also possessing a significantly lower viscosity than tris(2,3-dibromopropyl)phosphate.

Based on this disclosure, many other modifications and ramifications will naturally suggest themselves to those skilled in the art. These are intended to be comprehended as within the scope of this invention.

The embodiments of the invention in which an exclusive property or privilege is claimed are defined as follows:

1. A flame-retardant polymeric composition comprising a polymer selected from the group consisting of polyurethane including flexible and rigid foams and elastomers, polyester, both saturated and unsaturated polyester, styrenated polyester and cellulosic polyester blends, and a flame retarding amount of a compound of the formula

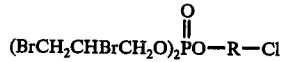

wherein R is a straight or branched chain alkyl group containing from 2 to about 12 carbon atoms.

2. The polymeric composition of claim 1 wherein R is a straight or branched chain alkyl group containing from about 2 to about 6 carbon atoms.

3. The polymeric composition of claim 1 wherein R is a straight chain alkyl group containing from about 2 to about 4 carbon atoms.

4. The polymeric composition of claim 1 wherein said compound is selected from the group comprising bis(2,3-dibromopropyl)-2-chloroethyl phosphate, bis(2,3-dibromopropyl)-2-chloropropyl phosphate, bis(2,3-dibromopropyl)-3-chloropropyl phosphate, bis-(2,3-dibromorpopyl)-6-chlorohexyl phosphate, and bis(2,3-dibromopropyl)-1-chloro-2-propyl phosphate.

5. The polymeric composition of claim 4 wherein said compound is bis(2,3-dibromopropyl)-2-chloroethyl phosphate.

6. A flame-retardant polyurethane polymeric composition containing a flame retardant amount of a compound of the formula

wherein R is a straight or branched chain alkyl group containing from about 2 to about 12 carbon atoms.

7. The polymeric composition of claim 6 wherein said polymer is polurethane, and wherein said compound is bis(2,3-dibromopropyl)-2-chloroethyl phosphate.

8. A flame-retardant polyester polymeric composition containing a flame retardant amount of a compound of the formula

wherein R is a straight or branched chain alkyl group containing from about 2 to about 12 carbon atoms.

9. The polymeric composition of claim 8 wherein said compound is bis(2,3-dibromopropyl)-2-chloroethyl phosphate.

* * * * *